(12) United States Patent
Rothman et al.

(10) Patent No.: US 6,996,641 B2
(45) Date of Patent: Feb. 7, 2006

(54) APPARATUS AND METHODS FOR KEYBOARD DATA NORMALIZATION

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/283,541

(22) Filed: Oct. 30, 2002

(65) Prior Publication Data

US 2004/0088453 A1    May 6, 2004

(51) Int. Cl.
*G06F 13/38* (2006.01)
*G06F 9/00* (2006.01)

(52) U.S. Cl. ............... 710/67; 710/10; 713/2; 341/26

(58) Field of Classification Search ............ 710/67, 710/65, 72, 73, 10; 341/20, 22, 26; 713/1, 713/2; 709/222
See application file for complete search history.

(56) References Cited

U.S. PATENT DOCUMENTS

| | | | | |
|---|---|---|---|---|
| 5,485,622 A | * | 1/1996 | Yamaki | 713/200 |
| 5,606,674 A | | 2/1997 | Root | 395/346 |
| 5,828,900 A | | 10/1998 | DeLeeuw et al. | 395/836 |
| 5,847,954 A | | 12/1998 | Beard et al. | 364/189 |
| 5,999,996 A | * | 12/1999 | Dunn | 710/64 |
| 6,422,476 B1 | * | 7/2002 | Ackley | 235/494 |
| 6,456,277 B1 | * | 9/2002 | Satoh et al. | 345/168 |
| 2002/0054120 A1 | | 5/2002 | Kawano et al. | |
| 2002/0116707 A1 | * | 8/2002 | Morris et al. | 725/37 |
| 2002/0120654 A1 | * | 8/2002 | Xu | 707/536 |
| 2003/0210232 A1 | * | 11/2003 | Chen | 345/168 |

* cited by examiner

*Primary Examiner*—Kim Huynh
(74) *Attorney, Agent, or Firm*—Hanley, Flight & Zimmerman, LLC

(57) ABSTRACT

Apparatus and methods for keyboard data normalization are disclosed. The example apparatus and methods convert physical location dependent keyboard data into keycap dependent data in a pre-boot environment.

20 Claims, 4 Drawing Sheets

APPARATUS AND METHODS FOR KEYBOARD DATA NORMALIZATION

TECHNICAL FIELD

The present disclosure pertains to data processing and, more particularly, to apparatus and methods for keyboard data normalization.

BACKGROUND

Computer systems typically include a keyboard input device that allows a user to enter data that is processed by a processor. The processor of a computer system has pre-boot and post-boot operating modes. In the pre-boot operating mode, the processor firmware processes information provided by the keyboard and allows a user to alter various settings of the computer system. In the post-boot operating mode, peripherals and peripheral handling software such as a keyboard driver have been loaded, or booted, and are now operational on the processor.

Conventional keyboard handling firmware is designed to receive scan codes (if the keyboard is a PS/2-type keyboard) or human interface device codes (HIDs) (if the keyboard is a Universal Serial Bus-type (USB-type) keyboard). Both scan codes and HIDs are forms of key location information having values that are key location dependent, regardless of the keycap value on the key being depressed. For example, on a conventional United States (U.S.) keyboard, key number 40 is assigned the keycap value of the semicolon (;). The scan code for key number 40, whether or not the semicolon is the keycap value on key number 40, is 0x4C. Similarly, the HID of key number 40, whether key number 40 has a keycap value of the semicolon or not, is 0x33. In no case does the key location provided by the keyboard to the firmware represent the keycap value of a key. To the contrary, the key location information provided by the keyboard, whether that information is a scan code or an HID, is representative of the physical location of the key that is being depressed.

In pre-boot operating mode, the conventional firmware stores a power-on password as key location information, such as a series of scan codes or HIDs. To power up a system, an administrator is required to enter the power-on password by depressing a series of keyboard keys to generate scan codes corresponding to the stored power-on password. The firmware, upon receiving the series of scan codes/HIDs corresponding to the stored power-on password, enables further boot of the processor during which, for example, a keyboard driver may be loaded to handle input from a keyboard.

The advent of remote administration, where an administrator at a remote administration computer controls the operation of one or more client computers over a network connection, has created a situation in which, for example, an administrator on one continent can administer a client computer located on another continent. Information exchanged between the administrator and a client is formatted in, for example, a Unicode format, which is a keycap-dependent format. However, in pre-boot situations, because power-on passwords are stored in scan code/HID format and because client-administrator communication is carried out in, for example, Unicode, there is usually no correlation between the Unicode password that the administrator is typing and the power-on password that is stored in scan code/HID format. Accordingly, it is difficult or impossible for an administrator to remotely enter a power-on password for a client.

DETAILED DESCRIPTION

Figure 1:
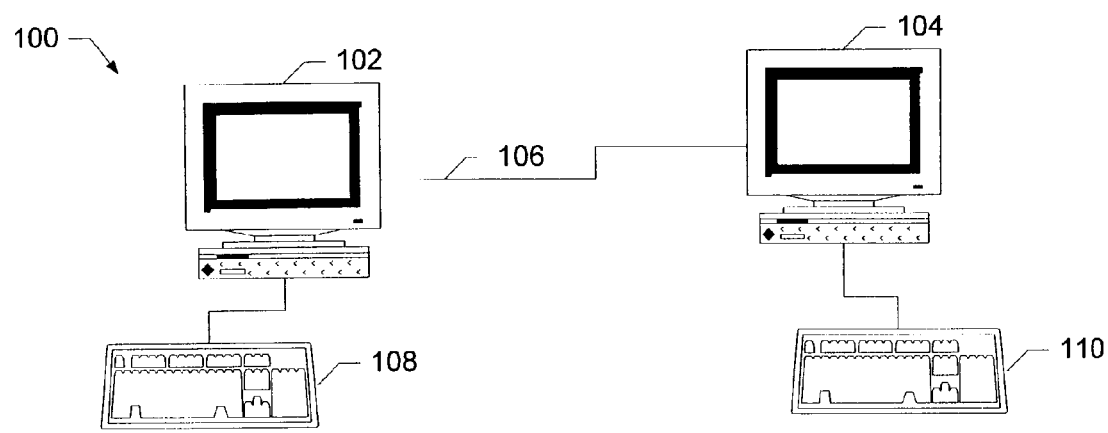
FIG. 1 is a diagram of an example networked computer system.

FIG. 1 illustrates an example computer system 100 including a first computing device 102 coupled to a second computing device 104 through a communication link 106. The first and second computing devices 102, 104 have associated keyboards 108, 110, respectively. Two computing devices 102, 104 are shown in FIG. 1 merely for illustrative purposes, but any other number of computing devices could be networked through the communication link 106 or other communication links. When the two computing devices 102, 104 exchange information over the communication link 106, such an information exchange takes place via the exchange of keycap data such as, for example, Unicode.

As will be readily appreciated by persons of ordinary skill in the art, given available networking tools such as, local area networks (LANs), wide area networks (WANs) and the Internet, the first and second computing devices 102 and 104 need not be in the same geographical area and may, in fact, be located in widely separated locations (e.g., different countries, different continents, etc.). Accordingly, as described in detail hereinafter with respect to FIGS. 2–4, the keyboards 108, 110 associated with the computing devices 102, 104 may have different keycap layouts. For example, the first keyboard 108 could have a conventional U.S. keyboard layout and the second keyboard 110 could have a conventional German keyboard layout. The two layouts could include some physical key locations having identical keycaps or could include identical keycaps that are located in different physical positions. Additionally, the two keyboards 108, 110 could include completely different physical key locations.

In the example of FIG. 1, the second computing device 104 is remotely administering the first computing device 102. Accordingly, the second computing device 104 is providing information such as, for example, a power-on password to the first computing device 102 before the first computing device 102 has loaded its keyboard processing software, such as a keyboard driver. The information provided by the second computing device 104 to the first computing device 102 may be, for example, in Unicode format because the second computing device 104 is in a post-boot operation mode. The first and second computing devices 102, 104 may be embodied in commercially available computer systems, such as personal computers, workstations or servers.

Figure 2:
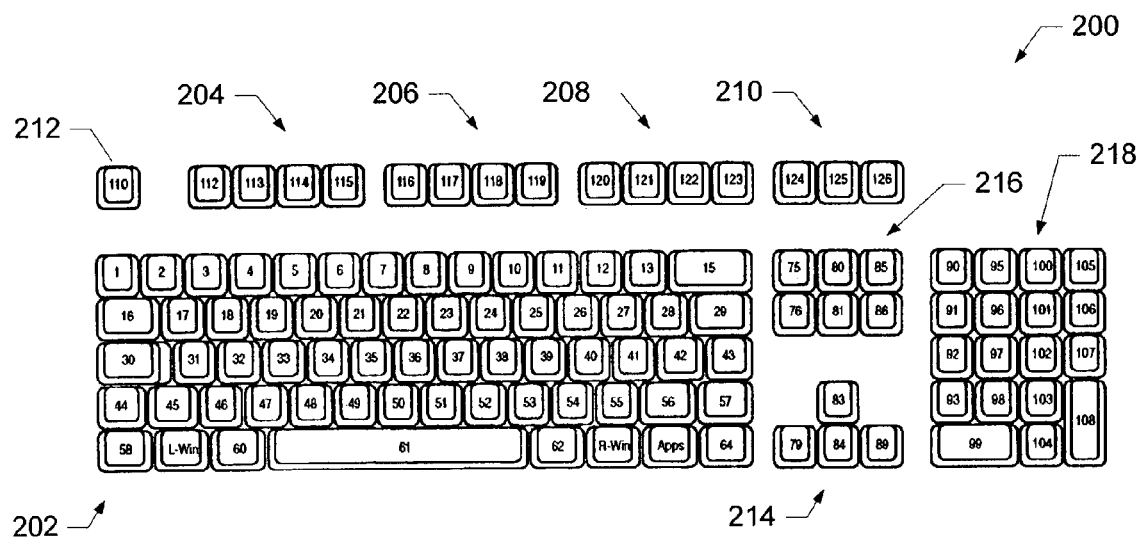
FIG. 2 is a representation of an example keyboard layout having no keycap values.

As shown in FIG. 2, an example keyboard layout 200, which is one manner in which the keys of the keyboards 108 and 110 of FIG. 1 may be laid out, includes a number of keys that are grouped by functionality. The example keyboard layout 200 includes numerical references printed on most of the keys. These numerical references are not the keycap values themselves, but merely physical key position references that are used below in conjunction with a description of the keycaps that may be assigned to the various keys.

The keyboard layout 200 includes a main section 202 that, in most keyboard layouts, includes keys that are assigned keycaps representative of the various letters of an alphabet or numbers. Key sections designated by reference designators 204, 206, 208 and 210 are commonly assigned keycaps and functionality of function keys (e.g., the keys F1–F12, etc. on a keyboard). The key designated with reference numeral 212 is commonly assigned a keycap value of ESC. A section of keys referred to by reference designator 214 may be assigned keycap values of up, down, left and right arrows and the section of keys at reference designator 216 may include keycaps of HOME, END, INS, DEL and the like. The keys in section 218 are typically assigned keycaps associated with conventional adding machine functionality. For example, the section of keys 218 may have numeric keycap values and may also include conventional addition, subtraction, multiplication and division keycap values.

Figure 3:
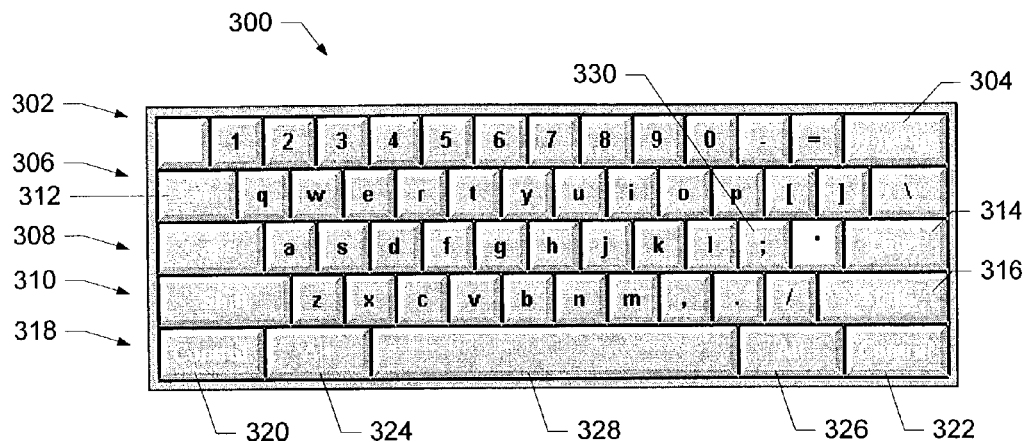
FIG. 3 is a representation of an example U.S. keyboard layout.

As shown in FIG. 3, an example U.S. keyboard layout 300 includes a number of keycaps placed on the keys of a keyboard layout such as the main keyboard section 202 of FIG. 2. In particular, the illustrated U.S. keyboard layout 300 includes a first row 302, which includes, primarily, keycaps representing the numbers one through nine and a backspace keycap 304. The U.S. keyboard layout 300 further includes three rows of keycaps representing the English alphabet 306, 308 and 310. In the illustrated example, the row 306 also includes a TAB keycap 312 and the row 308 includes an ENTER keycap 314. The row 310 also includes a SHIFT keycap 316. The bottom or lowest row 318 of the U.S. keyboard layout 300 includes first and second CONTROL keycaps 320, 322, first and second ALT keycaps 324, 326 and a spacebar keycap 328. As shown in FIG. 3, on the example U.S. keyboard layout 300, a semicolon keycap 330 is located on key number 40 of FIG. 2. While one example U.S. keyboard layout is shown in FIG. 3, it will be readily appreciated by those having ordinary skill in the art that the U.S. keyboard layout of FIG. 3 is merely for illustrative purposes and other keyboard layouts could be selected.

Figure 4:
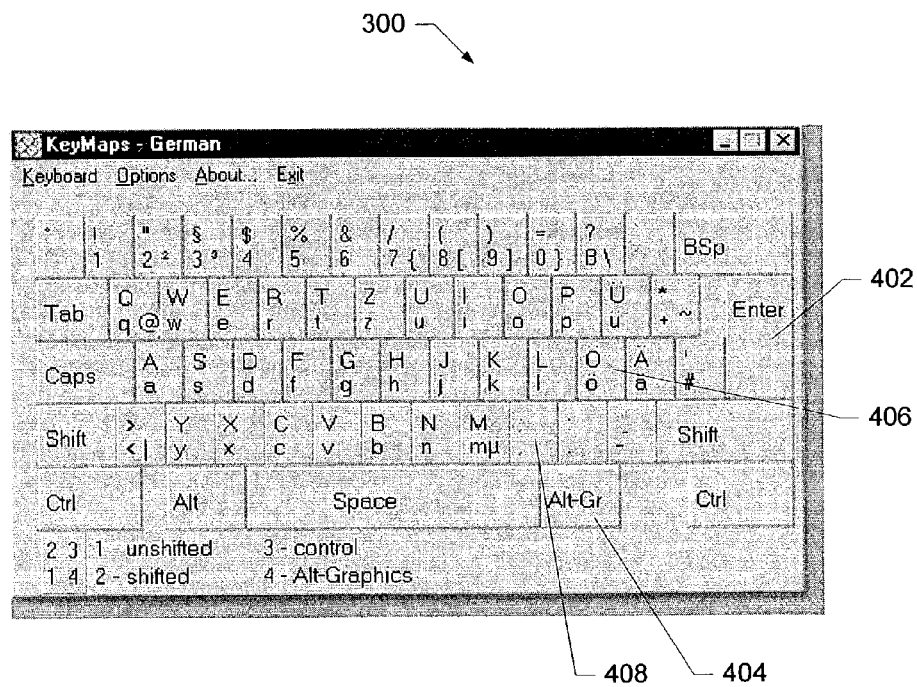
FIG. 4 is a representation of an example German keyboard layout.

An example German keyboard layout 400, as shown in FIG. 4, also includes a number of keycaps arranged in a key layout, such as the key layout 200 of FIG. 2. The German keyboard layout 400 differs from the U.S. keyboard layout 300, in relevant part, in that the enter keycap 402 is shaped differently and the German keyboard layout 400 includes an ALT-GR key 404. Additionally, on the German keyboard layout 400, the key number 40 of FIG. 2 has an Ö keycap 406, whereas the semicolon (;) keycap 408 in the German keyboard layout 400 is located a row below its place in the U.S. keyboard layout 300 of FIG. 3.

The German keyboard layout 400 of FIG. 4 is merely illustrative and numerous other German keyboard layouts could be selected. Furthermore, the example of a German keyboard is provided merely as a contrast to the keycap layout of the U.S. keyboard described above. Accordingly, in practice, the keyboard of any country or language could be substituted for the example German keyboard and/or the example U.S. keyboard.

The difference in the location of the semicolon keycap between the U.S. and German keyboard layouts is significant because, using conventional firmware, any power-on password including a semicolon would not be properly decoded by a U.S. computing unit that is being remotely administered by a computing unit using a German keyboard layout. This is because the scan code/HID of the semicolon, when entered on the German keyboard, is different than the scan code/HID produced when the semicolon key is depressed on the U.S. keyboard. Because conventional firmware operates on scan codes/HIDs, rather than on data corresponding to the actual keycap value of the key being depressed, physical relocation of a keycap will affect any power-on password including the relocated keycap. Additionally, as noted previously, information exchanged across the communication link 106 is not formatted in scan codes/HIDs.

Figure 5:
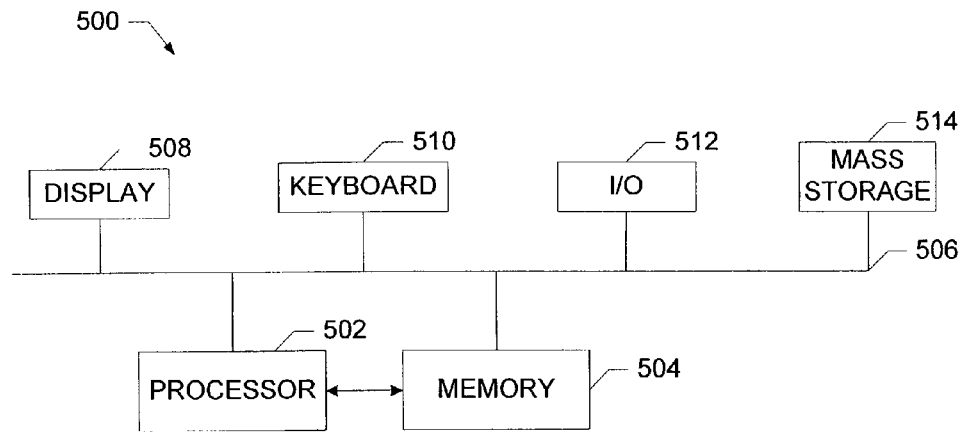
FIG. 5 is a diagram of an example computing unit.

FIG. 5 substantially illustrates a computer 500 that may implement either or both of the computing units 102 and 104. The computer 500 includes a processor 502 having an associated memory 504. The processor 502 is interfaced to a bus 506 to which a number of different components may be interfaced. For example, a display 508, a keyboard 510, which may be a U.S. keyboard, a German keyboard or any other suitable keyboard, other input/output devices 512 and mass storage device(s) 514 may be coupled to the bus 506. As will be readily appreciated by one of ordinary skill in the art, additional or fewer items than are shown in FIG. 5 may be coupled to the bus 506.

In practice, the processor 502 may be embodied in a microprocessor, such as any processor from the Intel® Pentium®, the Intel® X-Scale™, and in the Intel® Itanium® families of microprocessors. Alternatively, the processor 502 may be embodied in any other suitable microprocessor that is or may become commercially available. The memory 504 may be embodied in random access memory (RAM), read only memory (ROM) or any suitable combination thereof.

The processor 502 includes firmware instructions, such as a basic input/output system (BIOS). The memory 504 includes instructions stored thereon that may be loaded into and executed by the processor 502. The hardware and/or software and/or firmware converts scan codes/HIDs, which are codes dependent on the physical position of the key being depressed regardless of the keycap value of the depressed key, into keycap-dependent information that is independent of the physical location of the keycap being depressed.

Figure 6:
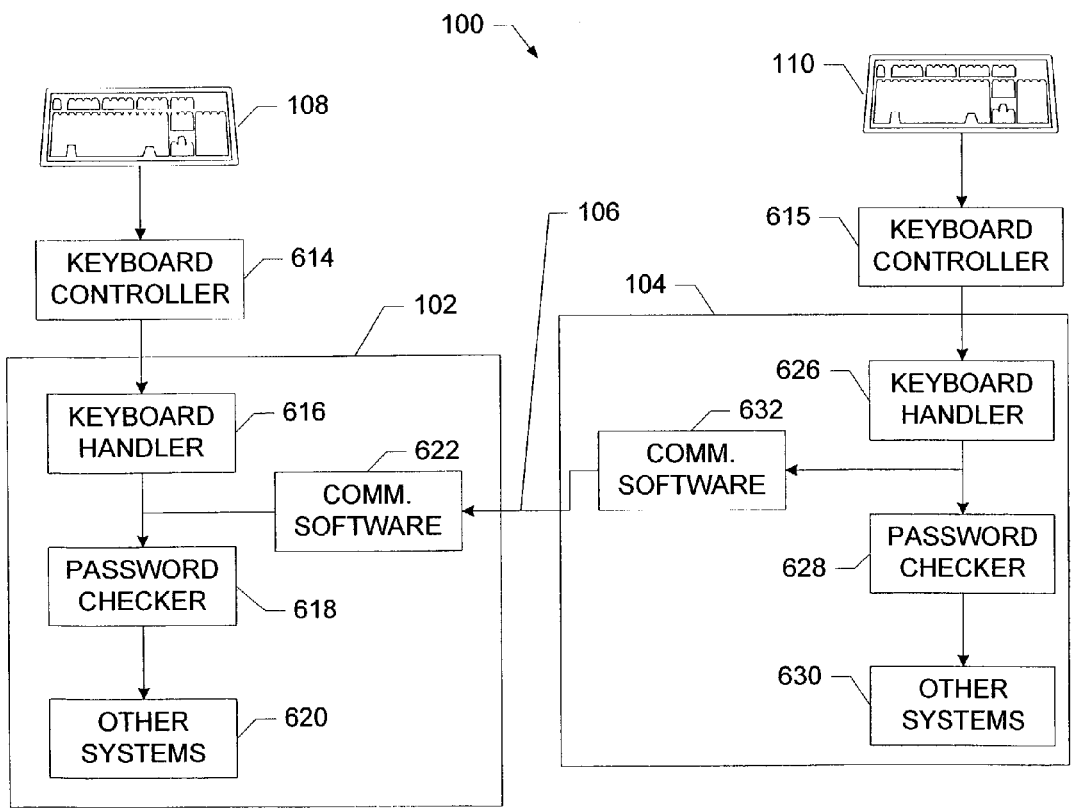
FIG. 6 is a detailed diagram of an example networked computer system.

Turning now to FIG. 6, further detail of the system 100 including a first computing unit 102 coupled to the second computing unit 104 through the communication network 106 reveals operational functionality of the first and second computing units 102, 104. The first computing unit 102 is coupled to the keyboard 108 through a first keyboard controller 614 and the second computing unit 104 is coupled to the keyboard 110 through a second keyboard controller 615. For illustrative purposes, the system depicted in FIG. 6 is described as a system in which the second computing unit 104 is remotely administering the first computing unit 102.

The keyboard controller 614 monitors the keyboard 108 to determine if any keypresses have been made. For example, the keyboard controller 614 may respond to keypresses on the keyboard 108 in an interrupt-type manner, subsequently reading scan codes/HIDs provided by the keyboard 108. Alternatively, the keyboard controller 614 may be instructed by software or firmware to periodically monitor a predetermined memory location or register for key location information, such as scan codes/HIDs, provided by the keyboard 108. In such an arrangement, the keyboard controller 614 knows that a key has been pressed when a scan code/HID is present in the predetermined location.

Upon detecting a keypress at the keyboard 108, the keyboard controller 614 passes the scan code/HID from the keyboard 108 to, for example, a keyboard handler 616. The keyboard handler 616 converts the key location dependent scan code/HID information into a keycap code representative of the keycap value of the depressed key. The keyboard handler 616 performs this function through the use of a lookup table (LUT), such as the example table shown in Table 1 below. The example of Table 1 assumes that the keyboard 108 has the U.S. keyboard layout 300 of FIG. 3. Because the keyboard handler 616 knows the current state of the keyboard (e.g., if the SHIFT or ALT keys are depressed), the keyboard handler 616 can determine the keycap value that the user seeks to enter. For example, if the scan code/HID reveals that the user depressed the number 40 key (see FIG. 2), the keyboard handler 616 can determine the Unicode value to output based on the state of the SHIFT and ALT keys. In particular, based on Table 1, a scan code of 0x4C or an HID of 0x33 results in a Unicode value of 0x003B if no other keys are depressed because the Unicode value of 0x003B corresponds directly and solely to the keycap value of a semicolon.

TABLE 1

| Scan code/HID | No other presses | SHIFT PRESSED | ALT PRESSED | CONTROL PRESSED |
|---|---|---|---|---|
| 0x4C/0x33 | 0x003B | 0x003A | 0x0000 | 0x0000 |

In the provided example, the output of the keyboard handler 616 is the Unicode value corresponding to the keycap value of the key that was pressed on the keyboard. For example, if key number 40 were pressed on the keyboard 108 having the U.S. keyboard layout of FIG. 3, the keyboard handler 616 would pass the Unicode value of 0x003B to a password checker 618.

The password checker 618 compares the Unicode values from the keyboard handler 616 to a stored power-on password that is also in a keycap information format such as Unicode. The password checker 618 generates an output that is passed to other systems 620, which may be embodied in hardware, software or firmware operating on the processor 102. The information passed to the other systems 620 may enable further boot of the processor 102 or other suitable operations. As is described in further detail hereinafter, the processor 102 may operate communication software 622 that receives commands, such as power-on passwords and the like from the processor 102 and couples the received information to the password checker 618.

The processor 104, which is coupled to the keyboard 110, includes a keyboard handler 626, a password checker 628, other systems 630 and communication software 632. The keyboard controller 615 may include functionality that is similar or identical to the functionality described in conjunction with the keyboard controller 614. In general, the keyboard controller 615 detects that a key on the keyboard 110 has been depressed and receives location dependent information such as, for example, a scan code/HID from the keyboard 110.

The keyboard handler 626 converts the key location dependent scan code/HID into a keycap-dependent code, such as, for example, Unicode. The keyboard handler 626 performs this function through the use of a lookup table (LUT), such as the example table shown in Table 2 below. For example purposes, Table 2 assumes that the keyboard 110 has the German keyboard layout 400 of FIG. 4. Because the keyboard handler 626 knows the current state of the keyboard (e.g., if the SHIFT or ALT keys are depressed), the keyboard handler 626 can determine the keycap value that the user seeks to enter. For example, if the scan code/HID reveals that the user depressed the number 40 key (see FIG. 2), the keyboard handler 626 can determine the Unicode value to output based on the state of the SHIFT and ALT keys. In particular, based on Table 2, a scan code of 0x4C or an HID of 0x33 results in a Unicode value of 0x00D6 if no other keys are depressed. The Unicode value of 0x00D6 corresponds directly and solely to the keycap value of Ö. Alternatively, if the shift key is pressed when the scan code of 0x4C or HID of 0x33 is received at the keyboard handler 626, the keyboard handler 626 will output the Unicode value of 0x00F6.

TABLE 2

| Scan code/HID | No other presses | SHIFT PRESSED | ALT PRESSED | CONTROL PRESSED |
|---|---|---|---|---|
| 0x4C/0x33 | 0x00D6 | 0x00F6 | 0x0000 | 0x0000 |

In this example, the output of the keyboard handler 626 is the Unicode value corresponding to the keycap value of the key that was pressed on the keyboard. For example, if key number 40 were pressed on the keyboard 110 having the German keyboard layout of FIG. 4, the keyboard handler 626 would pass the Unicode value of 0x00D6 to the password checker 628 that is adapted to process Unicode values. The password checker 628 would, in turn, process the Unicode values and generate an output that is passed to other systems 630, which may be an application that is operating on the processor 104.

The processor 104 may operate communication software 632 that receives commands, such as power-on passwords and the like from the keyboard handler 626 and passes the same to the communication software 622 of the processor 102. Because the information provided to the communication software 622 from the communication software 632 is keycap-dependent information, such as Unicode, and because the password checker 618 stores power-on passwords and processes keycap dependent information, the password checker 618 is insensitive as to whether keyboard information, such as power-on passwords and the like, is being provided from the keyboard 108 or the keyboard 110 via the communication link 106. Accordingly, the processor 104 may be used to remotely administer the processor 102.

While the foregoing description provides an example apparatus in which a keyboard handler performs the task of converting key location information into keycap information, such an apparatus may be implemented in a number of different ways. For instance, the functionality described above in connection with the keyboard handler could be carried out in hardware, software, firmware or in any suitable combination thereof. Additionally, while the foregoing specifies Unicode as keycap information, it should be understood that Unicode is merely one example and other suitable substitutes to Unicode may be employed. Furthermore, while the foregoing describes the password checkers 618, 628 as storing power-on passwords, power-on passwords could be stored in other places, such as in hardware, software or firmware. Accordingly, the described storage of passwords in the password checker 618 is merely an example.

Figure 7:
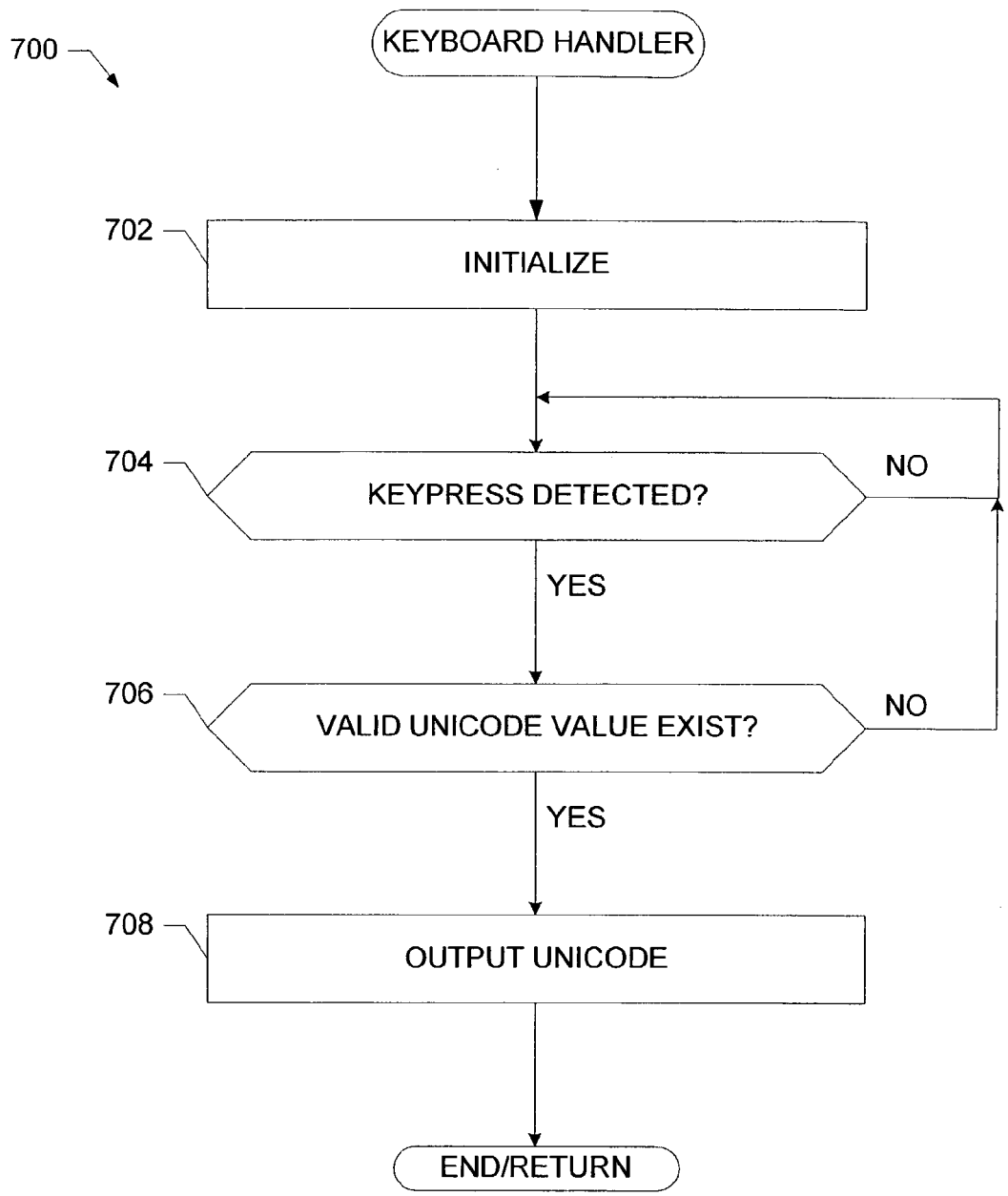
FIG. 7 is a flow diagram representing the operation of an example keyboard handler process.

FIG. 7 is a flow diagram representation of a keyboard handler process 700. The process 700 may be embodied in the keyboard handler 616 or 626 of FIG. 6. While the process 700 may be employed by either or both of the processors 102 and 104, the following description is provided in the context of the processor 102, it being understood that such an explanation is applicable to the processor 104.

The process 700 begins execution by initializing the keyboard controller 614 so that the keyboard controller 614 is enabled to communicate with the keyboard 108 (block 702). After initialization, the process 700 monitors the keyboard controller 614 and waits for an indication that keypresses have been made at the keyboard 108 (block 704). The process 700 waits for keypresses to be detected and, when a keypress is detected (block 704), the process 700 receives the scan code/HID corresponding to the key location of the depressed key and determines if a valid Unicode value exists that corresponds to the keypress (block 706). The process 700 may determine if a valid Unicode value exists for the depressed key by, for example, accessing a LUT, such as the LUT described in conjunction with block 616 of FIG. 6, and determining if there is a Unicode entry corresponding to the scan code/HID.

If no valid Unicode value corresponds to the scan code/HID (block 706), the information received by the keyboard controller 614 is treated as invalid and the process 700 returns to determining if a keypress is detected (block 704), thereby effectively ignoring the keypress. In the alternative, if a valid Unicode value exists that corresponds to the scan code/HID (block 706), the corresponding Unicode value is output from the keyboard handler 616 to the password checker 618 (block 708), which checks the integrity of the provided power-on password. Accordingly, the keyboard handler process 700 converts any valid key location information (like a scan code/HID) into keycap information, such as Unicode information.

From the foregoing, persons of ordinary skill in the art will appreciate that the above-described example apparatus and methods provide keyboard data normalization capability, which enables a user to enter a power-on password into the firmware of a processor, regardless of the physical configuration of the keys on the keyboard on which the user is typing and regardless of whether the power-on password is being entered by a remote administrator over a network. While prior firmware versions have operated based upon power-on passwords stored in a key location information format, such as scan codes/HIDs, the disclosed systems process information from a keyboard based on the keycap values keyed in by the user and stores power-on passwords based on keycap information. In converting the key location-dependent information into keycap-dependent information, the ease with which remotely administered clients may be controlled is enhanced because keyboard data is normalized to keycap data. The normalization process enables remote administration of clients because power-on passwords may be stored in keycap information form in addition to, or in place of, conventional key location information form, such as scan codes/HIDs.

Although certain methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of converting keyboard location dependent data into keycap-dependent data in a general purpose computer during a pre boot operation mode, the method comprising:
    prior to loading a keyboard processing software, receiving an indication at the general purpose computer that a key of a keyboard has been depressed;
    reading a first code indicative of a physical location of the depressed key;
    converting the first code into a second code indicative of a keycap value corresponding to the depressed key; and
    outputting the second code indicative of the keycap value corresponding to the depressed key;
    wherein the reading, converting, and outputting are performed prior to loading the keyboard processing software and are performed by processor firmware.

2. A method as defined by claim 1, wherein converting the first code into a second code comprises:
    accessing a table containing entries of keyboard location dependent data and entries of keycap values to which the entries of keyboard location dependent data correspond; and
    reading from the table a second code indicative of the keycap value to which the physical location of the depressed key represented by the first code corresponds.

3. A method as defined by claim 1, wherein the keyboard processing software comprises a keyboard driver.

4. A method as defined by claim 1, wherein the first code comprises a scan code.

5. A method as defined by claim 1, wherein the first code comprises a human interface device (HID) code.

6. A method as defined by claim 1, wherein the second code comprises a Unicode representation of the keycap value.

7. A method as defined by claim 1, wherein converting the first code into a second code comprises the use of a lookup table.

8. A method as defined by claim 7, wherein the lookup table comprises a firmware lookup table.

9. A computer communication system comprising:
    a communication link;
    a first general purpose computing device including:
        a first keyboard comprising a first plurality of keys arranged in a first configuration;
        a first processor coupled to the first keyboard and the communication link, wherein the first processor executes instructions that cause the first processor to:
            detect that a first key of the first plurality of keys has been depressed;
            read a first code indicative of a physical location of the first key;
            convert the first code into a second code indicative of a keycap value corresponding to the first key; and
            output to the communication link the second code indicative of the keycap value corresponding to the first key; and
    a second general purpose computing device including:
        a second keyboard comprising a second plurality of keys arranged in a second configuration different from the first configuration;
        a second processor coupled to the second keyboard and the communication link, wherein prior to loading keyboard processing software associated with the second keyboard, the second processor executes firmware instructions that cause the second processor to to operate in a pre-boot operation mode:
receive from the communication link the second code and to process the second code;
detect that a second key of the second plurality of keys has been depressed;
read a third code indicative of a physical location of the second key;
convert the third code into a fourth code indicative of a keycap value corresponding to the second key; and
output the fourth code indicative of the keycap value corresponding to the second key.

10. A computer communication system as defined by claim 9, wherein the second processor executes instructions that cause the processor to convert the third code into a fourth code by causing the processor to:
access a table containing entries of keyboard location dependent data and entries of keycap values to which the entries of keyboard location dependent data correspond; and
read from the table the fourth code indicative of the keycap value to which the physical location of the second key represented by the third code corresponds.

11. A computer communication system as defined by claim 9, wherein the keyboard processing software comprises a keyboard driver.

12. A computer communication system as defined by claim 9, wherein the first keyboard comprises a PSI/2-type keyboard.

13. A computer communication system as defined by claim 12, wherein the first code comprises a scan code.

14. A computer communication system as defined by claim 9, wherein the first code comprises a human interface device (HID) code.

15. A computer communication system as defined by claim 14, wherein the first keyboard comprises a universal serial bus (USB) keyboard.

16. A computer communication system as defined by claim 9, wherein the second code comprises a Unicode representation of the keycap value.

17. A computer communication system as defined by claim 9, wherein the first general purpose computing devices include lookup tables to convert physical key locations into keycap values.

18. A computer communication system as defined by claim 17, wherein the tables comprise firmware lookup tables.

19. A computer communication system as defined by claim 9, wherein the instructions executed by the first and second processors comprise firmware instructions.

20. A computer communication system as defined by claim 9, wherein the first processor executes instructions that cause the first processor to ignore the first key if the second code indicative of the keycap value corresponding to the physical location of the first key is not found in the table.

* * * * *